US 6,742,916 B1

United States Patent
Dunn

(10) Patent No.: US 6,742,916 B1
(45) Date of Patent: Jun. 1, 2004

(54) FIBER OPTIC LIGHT ASSEMBLY AND MOUNTING APPARATUS FOR BOATS

(76) Inventor: Charles B. Dunn, 4959 E. Dakota Ave., Fresno, CA (US) 93727

( * ) Notice: Subject to any disclaimer, the term of this patent is extended or adjusted under 35 U.S.C. 154(b) by 0 days.

(21) Appl. No.: 09/658,167

(22) Filed: Sep. 8, 2000

(51) Int. Cl.$^7$ .................................................. B60Q 1/00
(52) U.S. Cl. ...................... 362/477; 362/505; 362/511; 362/554; 362/540; 114/343
(58) Field of Search ................. 362/477, 505, 362/511, 544, 485, 483, 580, 554, 574, 540, 581; 114/343, 364, 219

(56) References Cited

U.S. PATENT DOCUMENTS

| | | | |
|---|---|---|---|
| 4,392,187 A | * | 7/1983 | Bornhorst .................... 362/233 |
| 4,740,870 A | | 4/1988 | Moore |
| 4,745,530 A | | 5/1988 | Farrell |
| 5,285,359 A | | 2/1994 | Czipri |
| 5,495,401 A | * | 2/1996 | Evans ......................... 116/26 |
| 5,653,519 A | | 8/1997 | Dobbs |
| 5,704,704 A | * | 1/1998 | Reichard et al. ................ 362/1 |
| 5,857,758 A | | 1/1999 | Dealey |
| 5,871,268 A | * | 2/1999 | Edens et al. ................... 362/32 |

* cited by examiner

*Primary Examiner*—Sandra O'Shea
*Assistant Examiner*—Bertrand Zeade
(74) *Attorney, Agent, or Firm*—Richard A. Ryan

(57) ABSTRACT

A light assembly and mounting apparatus for attaching fiber optic cable to the sides of a boat or other water craft for safety and enjoyment purposes. The light assembly includes a housing having a light emitter disposed in the housing for emitting light into a fiber optic cable disposed in a bumper guard that is incorporated into a frame member for attachment to the side of the boat. The preferred fiber optic cable is the side-emitting type that will illuminate the fiber optic cable along the entire length of the cable. The frame has a pair of upwardly and inwardly extending side members that securely enclose the bumper guard. A pair of cable guards extend outwardly from the frame beyond the outer surface of the fiber optic cable to protect the cable from damage. A cooling mechanism can be included in the housing to cool the light emitter. A color changing mechanism can be disposed between the light emitter and the proximal end of the fiber optic cable to change the color of the light before it enters the fiber optic cable.

20 Claims, 2 Drawing Sheets

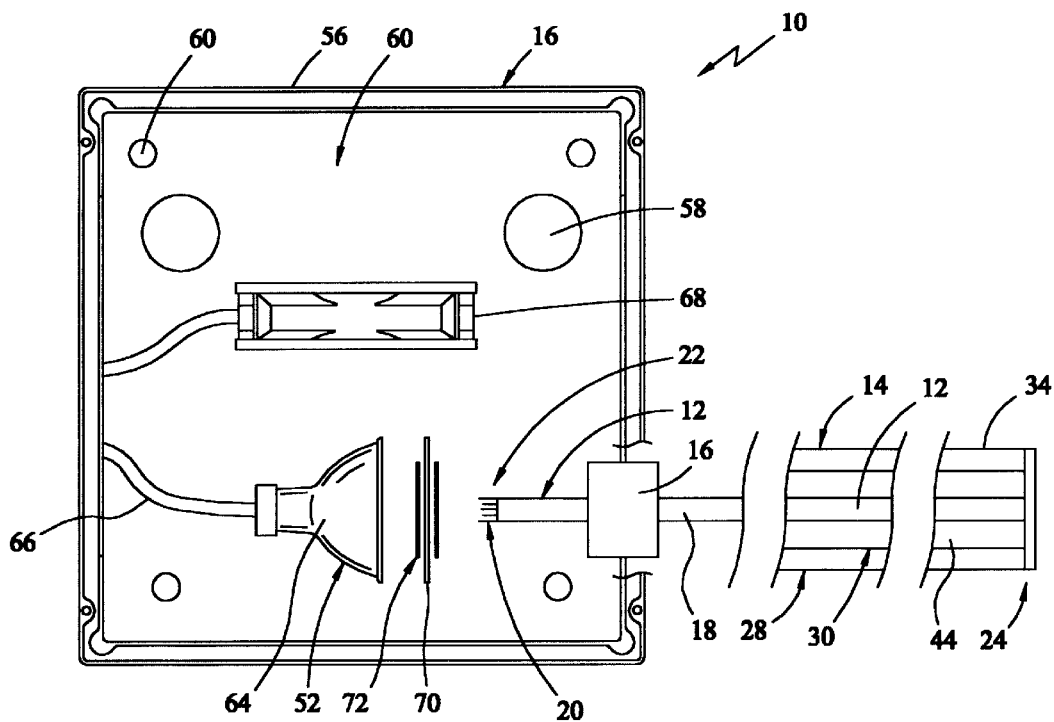
FIG. 1
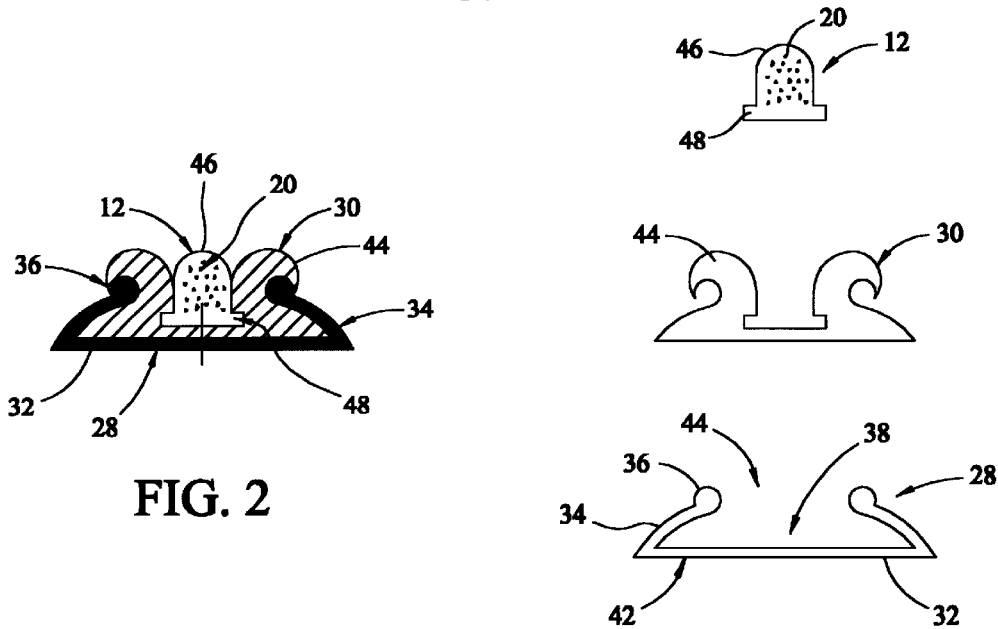
FIG. 2
FIG. 3

FIBER OPTIC LIGHT ASSEMBLY AND MOUNTING APPARATUS FOR BOATS

BACKGROUND OF THE INVENTION

A. Field of the Invention

The present invention relates generally to lighting systems for boats and other water craft. In particular, this invention relates to such lighting systems that utilize fiber optic cables on the exterior surface of a boat to better illuminate the boat at night and in other low light conditions. Even more particularity, the present invention relates to such lighting systems that have a frame and bumper guard to attach a fiber optic cable to the exterior surface, such as the side perimeter, of a boat and protect the cable from impact with other objects.

B. Background

It is well known that many people enjoy decorating or customizing their boats or other water craft. One way of decorating or customizing a boat or water craft is to place lights on its exterior surface. With regard to certain types of boats and other types of water craft, the use of lights on the exterior surface also provides significant safety aspects by illuminating the boat at night or during other low light conditions, such as fog. Although standard glass lights can be utilized on an exterior surface of a boat or other objects, these lights have a number of significant disadvantages that generally discourage such use. One obvious disadvantage is the likelihood of damaging the light(s) and, possibly, the boat itself if unintentional contact were to take place between the lights and another object. Another disadvantage is the inability to creatively place glass lights on an exterior surface of a boat due to the boat not being substantially planar along the sides where lights are most likely to be used. Yet another disadvantage of using regular lights is that electricity must be transmitted through electrical wires to the light bulbs, which can create dangerous conditions when used in or around water or water craft.

As a result of the disadvantages of glass lights, many people have turned to the use of fiber optic lights to provide the benefits discussed above with regard to lighting the exterior surface of a building or other structures. To the inventor's knowledge, however, fiber optic cable has not been used to illuminate the sides of boats. With regard to fiber optic cable generally, It is well known that fiber optic cable can be used to obtain a variety of lighting benefits. Typically, fiber optic cables consist of an outer plastic tubing with one or more strands of fibers inside the tubing that transmit light from one end of the tubing to the other end. Some types of fiber optic light cables utilize an opaque tubing that primarily transmits the light to the end of the tubing where it is used for various lighting purposes. Another type of fiber optic cable is known as side-emitting fiber optic cables due to the transparent nature of the tubing, which causes light to emit from the entire length of the tubing, or at least that portion that is not intentionally blackened out. The tubing is typically made out of plastic or other materials that are known to resist problems due to exposure to heat, water and other conditions, including those which are weather related. Unlike the electrical wires used for standard lighting, fiber optic cables do not transmit electricity along the length of the cable. Due to these and other properties, fiber optic cables have been used to illuminate and decorate the exterior surface of buildings and along the sides of pools.

Several patents have issued for the use of fiber optic cables or other light devices in association with boats or other water craft. For instance, U.S. Pat. No. 4,740,870 to Moore discloses a fiber optic system for boats that utilizes a centrally disposed light source that emits light into a plurality of fiber optic cables that radiate from a central light source to remote locations at the ends of the cables where a light fixture is located to disburse and transmit the light at the remote location. The purpose of the Moore patent is to provide a single, central high intensity light source that can be sealed and protected from the marine environment to distribute light for use at the remote locations. Another patent is U.S. Pat. No. 5,495,401 to Evans, which discloses a lighting system for boats which utilizes three electroluminescent strips that are embedded in the bumper guards surrounding the gunwale of a boat to form a substantially continuous illuminated loop around the boat for purpose of illumination at night. The Evans patent does not disclose the use of fiber optic cables in conjunction with the bumper guards on the exterior of the boat for the purpose of illuminating the sides of the boat or other water craft.

A major problem with the use of fiber optic cables on the sides of the boat is the likelihood that the boat will bump up against another object, such as a dock when bringing the boat in or another boat during those occasions when two or more boats join together. Although fiber optic cables are significantly more durable and damage resistant than glass lighting, they still can be damaged. In fact, a relatively small nick or break in the cable will diminish or totally prevent light from transmitting along the cable. If the nick or break is near the source of the light, then the entire string of cable beyond the nick or break will be dark. The only known way to fix such damage is to replace the fiber optic cable, which can be very expensive. The inventions described in the Moore and Evans patents do not discuss or address this problem. For the invention disclosed in the Moore patent, it is not necessary that the entire length (or any) of the fiber optic cable itself be visible from outside the boat. For the invention disclosed in the Evans patent, the inventor avoids the problems that are known to be associated with fiber optic cables by utilizing the electroluminescent strips embedded into a bumper guard. To the inventor's knowledge, no known light assemblies and mounting apparatuses exist that permit the use of fiber optic cables on the sides of a boat or other water craft without subjecting the fiber optic cable to the high risk of damage and the user to the likelihood of a costly replacement.

The known existing art, both individually and in all appropriate combinations, show that the broad concept of utilizing side-emitting fiber optic cables on the outer surfaces of objects to provide aesthetic and illumination benefits is well known. On the other hand, none of the known references teach a light assembly and mounting apparatus that is suitable for use on the exterior surface of a boat or other water craft that can hold, display and protect fiber optic cable so that it can be used to decorate and illuminate the surface on which it is to be installed. What is needed is a light assembly and mounting apparatus for fiber optic cables that is suitable for use on the exterior perimeter surface of boats and other water craft that can securely hold, conveniently display and safely protect the fiber optic cable from impact related damage.

SUMMARY OF THE INVENTION

The fiber optic light assembly and mounting apparatus of the present invention provides the benefits and solves the problems identified above. That is to say, the present invention discloses a light assembly system and mounting apparatus that allows persons to utilize fiber optic cables to decorate and illuminate the exterior surfaces of various water craft, including boats. In general, the present invention provides a light unit having an emitter that transmits light into and through a side-emitting fiber optic cable which is securely held inside a bumper guard mounted to a frame which is attached to the exterior surface of the boat. Although the bumper guard securely holds the fiber optic cable in the mounting apparatus, it is configured to allow the fiber optic cable to be seen from a distance and to protect the frame, boat and cable from impact damage.

In its broadest form, one embodiment of the present invention comprises a lighting unit having a light emitter inside a housing. The light emitter is configured to be connected to an internal or external power source. One end of a flexible, elongated fiber optic cable, which is configured to receive light from the light emitter and transmit the light through the fiber optic cable, attaches to, abuts or is inserted into the housing. Because the outer surface of the cable is transparent, the entire length of the fiber optic cable is illuminated. The mounting apparatus comprises a resilient bumper guard securely disposed in a frame that is suitable for attachment to the exterior surface of a boat. The bumper guard is configured to securely receive the fiber optic cable. Because the bumper guard protrudes outwardly from the frame beyond the outside surface of the fiber optic cable, it can protect the fiber optic cable from impact-type damage. For cable visibility, the bumper guard does not fully enclose the fiber optic cable.

In the preferred embodiment, the present invention has a lighting unit with a light emitter inside a housing that has a cable inlet on one wall of the housing. Also inside the housing is a cooling mechanism to cool the light emitter, which can be a high intensity light source. The cable is an elongated, side-emitting fiber optic cable with a flexible, transparent outer optical tubing with one or more strands of optic fibers disposed in the tubing. The strands of optical fibers are suitable for transmitting light from the proximal end of the cable. This end of the cable is disposed in the housing through the cable inlet. Because it is open and located such that the end is in light communication with the light emitter, light from the light emitter enters the strands of fibers and is transmitted throughout the cable to illuminate its entire length (unless the user desires to blacken or block out a portion of the cable). In the preferred embodiment, the frame has a pair of opposing side members that extend upwardly and inwardly from a base member, which can be integral with the side members, to form a partially enclosed cavity on the front side of the frame. The distal ends of the side members form an opening into the cavity. The resilient bumper guard is shaped and configured to be securely received in the partially enclosed cavity through the opening. A pair of cable guards on the bumper guard protrude outward from the base member beyond the outside surface of the fiber optic cable, which is securely received between the pair of cable guards. If desired, a color changing mechanism can be disposed between the light emitter and the proximal end of the fiber optic cable for changing the color of the light in the fiber optic cables for improved safety and aesthetic purposes. In addition, a flasher apparatus can be used to cause the light in the fiber optic cable to flash (i.e., in color).

Accordingly, the primary objective of the present invention is to provide a fiber optic light assembly and mounting apparatus to mount the fiber optic cable to the exterior surface, such as the side perimeter, of a boat or other water craft.

It is also an important objective of the present invention to provide a fiber optic light assembly and mounting apparatus that is suitable for holding, displaying and protecting fiber optic cable used on the exterior surface of a boat or other water craft.

It is also an important objective of the present invention to provide a light assembly that utilizes a light emitter in a housing that is in light communication with a fiber optic cable securely held and protected in a bumper and frame assembly that attaches to the sides of boats and other water craft.

It is also an important objective of the present invention to provide a light assembly for use with a mounting apparatus that securely holds a fiber optic cable along the side of a boat or other water craft to prevent impact-type damage from damaging the fiber optic cable used as part of the associated light assembly.

The above and other objectives of the present invention will be explained in greater detail by reference to the figures and the description of the preferred embodiment which follows. As set forth herein, the present invention resides in the novel features of form, construction, mode of operation and combination of parts presently described and understood by the claims.

BRIEF DESCRIPTION OF THE DRAWINGS

In the drawings which illustrate the best modes presently contemplated for carrying out the present invention:

FIG. 1 is a plan view of the present invention;

FIG. 2 is a cross-sectional view the fiber optic cable and mounting assembly of the present invention;

FIG. 3 is an exploded view of that shown in FIG. 2;

DETAILED DESCRIPTION OF THE PREFERRED EMBODIMENTS

With reference to the figures where like elements have been given like numerical designations to facilitate the reader's understanding of the present invention, and particularly with reference to the embodiment of the present invention illustrated in FIGS. 1 through 4, the preferred embodiment of the present invention is set forth below. The enclosed figures and drawings are merely illustrative of the preferred embodiments and represent several different ways of configuring the present invention. Although specific components, materials, configurations and uses are illustrated, it should be understood that a number of variations to the components and to the configuration of those components described herein and in the accompanying figures can be made without changing the scope and function of the invention set forth herein.

Figure 4:
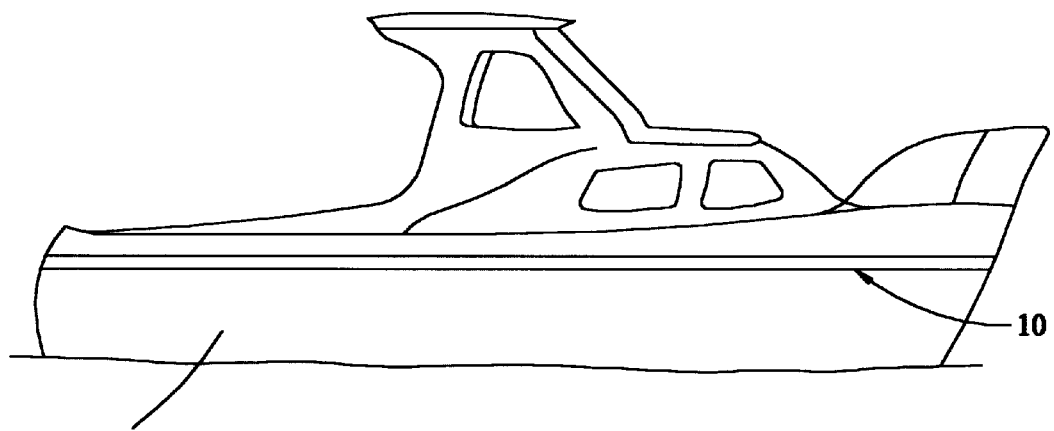
FIG. 4 is a side view of a boat utilizing the present invention.

The fiber optic light assembly and mounting apparatus for boats and other water craft of the present invention is shown generally as 10 in FIGS. 1 and 4. The principal components of the present invention are the fiber optic cable 12, mounting assembly 14 and lighting unit 16. These components function together to provide a light assembly and mounting apparatus for boats and other water craft that allows illumination of a full 360 degrees, if desired, around the boat or water craft. In general terms, fiber optic cable 12 is commonly available. As set forth below, however, the present invention 10 utilizes specially formed cable 12 that provides the benefits described disclosed herein. Fiber optic cable 12 has an outer transparent optical tube 18 made of an elongated, flexible material with one or more strands of optic fibers or rods 20 disposed in tube 18. This type of fiber optic cable is commonly referred to as side-emitting fiber optic cable because the light that is transmitted through the optic fibers 20 illuminates the entire surface of the cable 12, as opposed to merely delivering the light from the proximal end 22 of cable 12 (that end closest to the light source) to the distal end 24 of the cable 12 (that end furthest from the light source). As set forth above, this is one aspect that differentiates the present invention from that disclosed in the Moore patent.

Although other tubing material can transport light, such as white or clear tubing, fiber optic cable is preferred due to its light transmitting and emitting properties. For instance, it is known that fiber optic cables do not transmit electricity through the cables and the cables do not heat up from the transmission of the light. In addition, fiber optic cables allow use of different colored lights and are somewhat flexible so the user may follow the outline of a boat or other water craft. Fiber optic cable 12 is available from many sources. One such source is Fiberstars, Inc. in Freemont, Calif. Fiber optic cable 12 typically utilizes a tubing 18 that is made of material, such as PVC, that is generally impervious to water, salt and other chemicals common in the marine environment.

Inside the tubing 18 are one or more light transmitting optic fibers 20 that are typical for use with fiber optic cable 12. The number of optic fibers 20 inside tubing 18 is partially determinative of the brightness of the light emitting from the side of the cable 12, with more cables being brighter. The inventor has found that a fiber optic cable 12 having approximately 60 to 75 strands of optic fibers 20 inside tubing 18 is generally sufficient for the purposes of the present invention. The amount of light output from cable 12 is also dependant upon the quality and power of the illuminator used for delivering a light source to the optic fibers 20, the length of fiber optic cable 12 being used, the size (diameter) of the cable 12 and the ambient light conditions. To get the light into the optic fibers, the proximal end 22 of cable 12 should be open (i.e., not sealed or closed) such that the hollow optic fibers 20 can be exposed to the light source used to generate the light for transmission through cable 12. Distal end 24 can be closed to terminate the light or it can also be open to the light source, as set forth below with regard to FIG. 5.

The fiber optic cable is made part of a mounting assembly 14 that can then be attached to a boat 26, as shown in FIG. 4, or other types of water craft. In the preferred embodiment, shown best in FIG. 2, mounting assembly 14 comprises an elongated frame 28 and a generally resilient bumper guard 30. Frame 28 can be made out of extruded aluminum, such as is available from Universal Molding Company in Lynwood, Calif., or other materials, including other metals, fiberglass, plastic and various composites. As shown in FIG. 2, frame 28 is extruded into a shape that is suitable for securely holding bumper guard 30 in place. In the preferred embodiment, frame 28 has a base member 32 and a pair of opposing side members 34 that extend generally upwardly and inwardly from the sides of base member 32, as shown in FIG. 2. In this embodiment, frame 28 is single integral unit, such that base member 32 and side members 34 are extruded together from a single piece of raw material. The distal ends 36 of side members 34 form a partially enclosed cavity 38 on the front side 40 of frame 28 suitable for tightly grasping bumper guard 30. The back side 42 of frame 28 should be generally planar in order to be suitable for attachment to most boats 26 or other water craft. In some circumstances, it may be necessary to utilize a curved base member 32 to better conform to the surface to which frame 28 will attach. Frame 28 is attached to the sides of boat 26 by utilizing screws, rivets, adhesive or other commonly known means of securely attaching metal or other trim to the sides of a boat 26.

Mounting assembly 14 also includes bumper guard 30. As is known in the art, bumper guard 30 should be generally resilient so that it can absorb the impact with any other object, yet firm enough to protect the frame 28 and fiber optic cable 12. Bumper guard 30 may be made out of hard rubber, polyethylene or other suitable materials, as is commonly available. For instance, Rayko out of Santa Fe Springs, Calif. has a rubber bumper that can be formed into the desired configuration. As discussed below, bumper guard 30 should be formed into the desired shape to accomplish the objectives described herein, namely to be securely received into frame 28 and to tightly hold fiber optic cable 12 and protect cable 12 from impact while allowing display of the cable 12. In the preferred embodiment, bumper guard 30 is tightly enclosed in cavity 38 formed by frame 28 such that frame 28 securely holds bumper guard 30 in place. Although bumper guard 30 can be attached to frame 28 using adhesives, screws or other attachment methods, the preferred method is for bumper guard 30 and frame 28 to be configured such that no attachment mechanisms are required. Bumper guard 30 should be shaped to take advantage of frame 30 having side members 34, as described above.

In the preferred embodiment, as best shown in FIGS. 2 and 3, bumper guard 30 should be shaped and configured to include one or more cable guards 44 (a pair are shown). The cable guards 44 are molded extrusions that protrude beyond past the distal ends 36 of side members 34 on frame 28 and past the outer surface 46 of fiber optic cable 12. As configured, the cable guards 44 protect the cable 12 from impact damage that would likely occur if the mounting assembly 14 were to collide with another object. Cable guards 44 also reduce the likelihood that frame 28 would be damaged by such an event. As shown best in FIG. 2, bumper guard 30 is solid from the top of cable guards 44 to where bumper guard 30 contacts base member 32. Naturally, to accomplish the objective of placing cable 12 on a boat (i.e., visual appearance), the cable guards 44 of bumper guard 30 must be spaced sufficiently apart so that cable 12 can be as visible as possible. In the preferred embodiment, as shown in FIG. 2, cable guards 44 also fold over and enclose the distal ends 36 of side members 34 to protect that portion of frame 28 and reduce the likelihood that the other object (the object being collided with) will be damaged, such as due to a cutting action, from contact with frame 28.

As shown in FIGS. 2 and 3, fiber optic cable 12 is also shaped and configured to cooperate with bumper guard 30 so that bumper guard 30 may securely hold cable 12 in place. In the preferred embodiment, fiber optic cable 12 is extruded to include a lip member 48 that can be enclosed by bumper guard 30. As shown in FIG. 2, cable guard 44 folds over lip 48 to hold cable 12 securely in place without the need for adhesives or other fastening mechanisms. In this manner, cable 12 can be easily installed in bumper guard 30.

Lighting unit 16 provides the light source that is received by optic fibers 20 to illuminate fiber optic cable 12. In the preferred embodiment, as shown in FIG. 1, lighting unit 16 includes housing 50 that houses a light emitter 52 that provides the light to illuminate cable 12. Housing 50 can be an enclosed container made out of various materials suitable for use on a boat, such as aluminum, stainless steel, plastic, fiberglass and others. In the preferred embodiment, housing 50 has a bottom 54, sides 56 and a top (not shown) that encloses the components necessary for lighting unit 16 to provide a light source for cable 12. If desired, housing 50 can include sealing elements between sides 56 and the top to prevent water, salt and other marine chemicals from entering inside housing 50. In this embodiment, the top can latch or otherwise lock down onto the sides to prevent accidental opening. In the preferred embodiment, bottom 54 includes air holes 58 and mounting holes 60, as shown in FIG. 1. As described below, air holes 58 allow air used to keep light emitter 52 cool to be discharged from inside housing 50. Although air holes 58 could be located elsewhere, such as sides 56 and/or the top, placement of air holes 58 on the bottom reduces the visual effect of light escaping housing 50, which will light up the area around housing 50 if air holes are placed on the top or sides. Mounting holes 60 are used to mount housing 50 to the boat 26 or to equipment or storage facilities on boat 26 using screws, rivets, bolts or other commonly available attachment mechanisms (not shown).

In the preferred embodiment, shown in FIG. 1, housing 50 also includes a cable inlet 62 on one of the sides 56 of housing 50 to allow proximal end 22 of cable 12 to be inserted into housing 50 so that the optic fibers 20 at proximal end 22 can be in light communication with light emitter 52. Cable inlet 62 can include a clamping mechanism to tightly hold cable 12 in its proper position (i.e., with the proximal end 22 of cable 12 facing directly at light emitter 52 to facilitate as much light as possible going through cable 12). While the use of an inlet 62 having a clamping mechanism of some type is preferred due to its ability to securely hold the proximal end 22 of cable 12 in place, it is not required. Alternatively, proximal end 22 can merely abut against housing 50 so that optic fibers 20 receive light through a hole in the side 56 of housing 50 or a transparent portion (i.e., a window) of housing 50.

To illuminate cable 12, a light source is required to supply the light that travels through optic fibers 20 to illuminate cable 12. A number of off the shelf light sources, commonly referred to as illuminators, are available from companies that supply fiber optic cable. The inventor has chosen to include a lighting unit 16 that allows for several custom features, described below, not found in typical illuminators. The lighting unit 16 utilizes a high energy output lamp 64 connected via electrical wires 66 to a power source (not shown) located outside housing 50. In this embodiment, wires 66 exit housing 50 and connect to the standard 12 volt battery found on most boats. Alternatively, lighting unit 16 can include its own battery located inside housing 50, thereby eliminating the need to depend on the boat's regular battery. Lamp 64 can be a 12 volt light that produces 225 to 250 watts of energy. In general, the brighter the lamp 64, the brighter the light illuminating from cable 12.

Because the lamp 64 is a high intensity light in order to produce a bright enough light to illuminate cable 12, it generates a significant amount of heat that could accumulate in housing 50. To avoid problems associated with heat inside housing 50, the present invention includes a cooling apparatus to cool the interior of housing 50. As shown in FIG. 1, fan 68 is located adjacent to lamp 64 to draw air in and across lamp 64 to continually cool the interior of housing 50. The heated air is discharged out the air holes 58 in the bottom 54 of housing 50. The fan 68 should also be a 12 volt fan so that it can utilize the same power source as lamp 64. One type of fan 68 suitable for use as the cooling mechanism is a 12 volt DC Brushless Fan Motor available from Innovative Industrial Co., Ltd. Other types of fans can also be utilized as the cooling mechanism. As an alternative to a fan, there are other cooling mechanisms available to cool the interior of housing 50 so as to avoid heat accumulation. One such arrangement is described in U.S. Pat. No. 5,653,519 to Dobbs for a fiber optics illuminator system.

Figure 5:
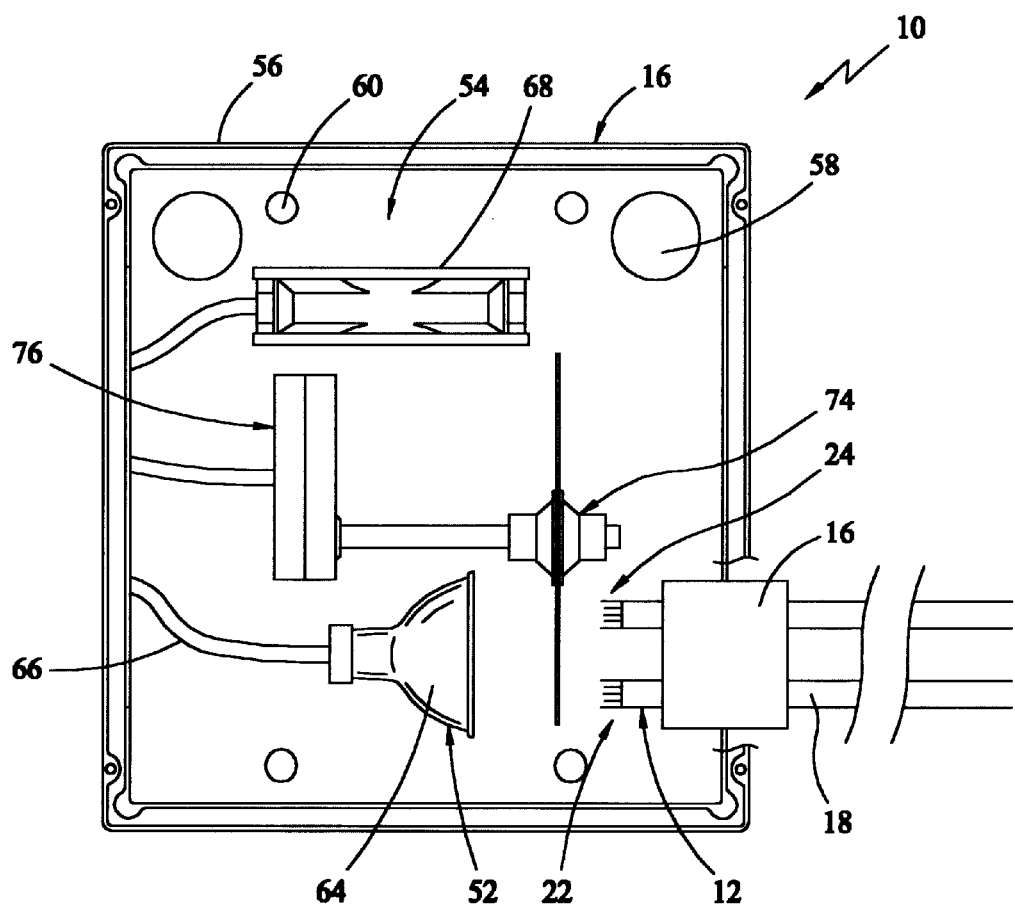
FIG. 5 is an alternative embodiment of the present invention showing the use of a loop fiber optic cable system and motorized color wheel.

Also inside the preferred embodiment of lighting unit 16 is a color changing mechanism to change the color of the light that enters into optic fibers 20 so as to change the color of cable 12. The color changing mechanism should be located between lamp 64 and the open proximal end 22 of cable 12 so that the optic fibers may receive the colored light for transmission throughout cable 12. In one embodiment, shown in FIG. 1, the color changing mechanism is a color plate mounting apparatus 70 for mounting one or more color plates 72. Mounting apparatus 70 can be a frame member that vertically receives one or more color plates to obtain the desired effect. For instance, the present invention could be supplied with a blue and red plate to illuminate cable 12 with blue or red, or the two plates could be put in together to form the color purple in cable 12. The color plates 72 could be placed into mounting apparatus 70 manually by the user of the present invention 10. Alternatively, the present invention 10 could be supplied with a color wheel 74, as shown in FIG. 5, that can be rotated to the desired color for cable 12. If desired, color changing mechanism could also be supplied with a motor 76 that is connected to color wheel 74 to rotate through the colors on the color wheel 74. As with the other components inside housing 50, motor 76 can be a 12 volt motor, such as Model 2L003 from Dayton Electric Mfg. Co. in Chicago, Ill., which rotates at the slow speed of 0.45 revolutions per minute. A switch (not shown) could be supplied to allow the user to selectively choose whether the motor 76 would rotate color wheel 74. Plate 72 or the color wheel 74 should be made out of a heat absorption glass that can withstand the heat generated by lamp 64. One of the color plates 72 or color wheel 74 colors can be clear. For emergency purposes, lighting unit 16 can also include an electric flasher mechanism (not shown) that causes the light from lamp 64 to flash, thereby creating a flashing effect through cable 12.

In use, the present invention 10 can be installed anywhere on a boat or other water craft that it is desired to have light. The inventor has found that attaching the mounting assembly 14 to the boat at the location where the deck meets the hull is the preferred and desirable location. The frame 28 can be attached using screws or other attachment mechanism directly to the boat. The fiber optic cable 12 can be placed into the bumper guard 30 or it can be supplied with the cable 12 already embedded into bumper guard 30. The combination fiber optic cable 12 and bumper guard 30 is placed into frame 28. The lighting unit 16 is placed in a secure location where it can connect to the boat's power supply (i.e., a 12 volt battery). A switch mechanism can be located near the controls of the boat 26 to allow the captain to activate the present invention 10 when desired. Once switched on, light from lamp 64 fills the optic fibers 20 and light begins illuminating from cable 12 around the boat 26. If a color mechanism is used, the desired color plate 72 can be placed into mounting apparatus 70, or the color wheel 74 can be turned, either manually or by activating motor 76, to the desired color. If an emergency arises, the user can activate the flashing mechanism to cause the light in fiber optic cable 12 to flash.

While there is shown and described herein certain specific alternative forms of the invention, it will be readily apparent to those skilled in the art that the invention is not so limited, but is susceptible to various modifications and rearrangements in design and materials without departing from the spirit and scope of the invention. In particular, it should be noted that the present invention is subject to modification with regard to the dimensional relationships set forth herein and modifications in assembly, materials, size, shape, and use. For instance, although the present invention has been discussed and shown in terms of its use with use along the side of a boat, it is not so limited. The mounting assembly can be placed on a variety of objects to obtain the same type of lighting effect as described above with a boat. In addition, those skilled in the art will recognize that the controls and power supply may be located in a variety of places and that the components in lighting unit are not limited to the configuration described above.

What is claimed is:

1. A fiber optic light assembly and mounting apparatus for a boat, comprising:
   a lighting unit having a housing and a light emitter, said light emitter disposed in said housing and connected to a power source;
   a flexible, elongated fiber optic cable having a proximal end, a distal end and a transparent outside surface, said fiber optic cable suitable for transmitting light therein and emitting light through said outside surface, said proximal end of said fiber optic cable configured so as to receive light through said proximal end of said fiber optic cable, said proximal end of said fiber optic cable attached to said housing and in light communication with said light emitter;
   an elongated frame attached to said boat; and
   a generally resilient bumper guard disposed in said frame and configured to securely receive said fiber optic cable, said bumper guard protruding outwardly from said frame beyond said outside surface of said fiber optic cable to protect said fiber optic cable.

2. The fiber optic assembly and mounting apparatus according to claim 1, wherein said lighting unit further comprises a cooling means for cooling said light emitter.

3. The fiber optic assembly and mounting apparatus according to claim 2, wherein said cooling means is a fan disposed in said housing and one or more vent openings in said housing for discharging hot air out of said housing.

4. The fiber optic assembly and mounting apparatus according to claim 1, wherein said lighting unit further comprises color changing means disposed between said light emitter and said proximal end of said fiber optic cable for changing the color of the light from said light emitter prior to the light entering said optic fibers.

5. The fiber optic assembly and mounting apparatus according to claim 4, wherein said color changing means has a color wheel for selectively changing the color of the light.

6. The fiber optic assembly and mounting apparatus according to claim 5, wherein said color changing means further comprises a motor for rotating said color wheel.

7. The fiber optic assembly and mounting apparatus according to claim 4, wherein said color changing means comprises a mounting apparatus for receiving one or more color plates.

8. The fiber optic assembly and mounting apparatus according to claim 1, wherein said fiber optic cable has one or more strands of optic fibers disposed therein for transmitting light therein and emitting light through said fiber optic cable, said optic fibers in light communication with said light emitter.

9. The fiber optic assembly and mounting apparatus according to claim 1, wherein said frame has a pair of opposing side members extending generally upwardly and inwardly from a base member to form a partially enclosed cavity on a front side of said frame.

10. The fiber optic assembly and mounting apparatus according to claim 9, wherein each of said side members has a distal end, said distal ends of said side members forming an opening into said cavity.

11. The fiber optic assembly and mounting apparatus according to claim 1, wherein said bumper guard is shaped and configured to be securely received in said frame.

12. The fiber optic assembly and mounting apparatus according to claim 1, wherein said fiber optic cable is shaped and configured to be securely received in said bumper guard.

13. The fiber optic assembly and mounting apparatus according to claim 1, wherein said bumper guard has one or more cable guards that protrude outwardly from said frame beyond said outside surface of said fiber optic cable, said one or more cable guards configured to securely receive said fiber optic cable.

14. The fiber optic assembly and mounting apparatus according to claim 1, wherein said distal end of said fiber optic cable is also disposed in said housing through said cable inlet and configured to allow said optic fibers in said optic tube to receive light from said light emitter, said optic fibers at said distal end in light communication with said light emitter for transmitting light through said optic fibers.

15. A fiber optic light assembly and mounting apparatus for a boat, comprising:
   a lighting unit having a housing and a light emitter, said light emitter disposed in said housing and connected to a power source;
   an elongated, side-emitting fiber optic cable comprised of a flexible, transparent optical tube having one or more strands of optic fibers disposed therein, said fiber optic cable having a proximal end, a distal end and an outside surface, said one or more strands of optical fibers suitable for transmitting light therein and emitting light through said optical tube, said proximal end of said fiber optic cable configured so that said optic fibers can receive light through said proximal end of said fiber optic cable, said proximal end of said fiber optic cable attached to said housing such that said optic fibers are in light communication with said light emitter;
   an elongated frame attached to said boat; said frame having a pair of opposing side members extending generally upwardly and inwardly from a base member to form a partially enclosed cavity on a front side of said frame; and
   a generally resilient bumper guard shaped and configured to be securely received in said partially enclosed cavity, said bumper guard having one or more cable guards protruding outwardly from said frame beyond said outside surface of said fiber optic cable, said one or more cable guards configured to securely receive said fiber optic cable.

16. The fiber optic assembly and mounting apparatus according to claim 15, wherein said lighting unit further comprises a cooling means for cooling said light emitter.

17. The fiber optic assembly and mounting apparatus according to claim 15, wherein said lighting unit further comprises color changing means disposed between said light emitter and said proximal end of said fiber optic cable for changing the color of the light from said light emitter prior to the light entering said optic fibers.

18. The fiber optic assembly and mounting apparatus according to claim 15, wherein each of said side members has a distal end, said distal ends of said side members forming an opening into said cavity, said bumper guard enclosing said distal ends of said side members.

19. A fiber optic light assembly and mounting apparatus for a boat, comprising:

a lighting unit having a housing and a light emitter, said light emitter disposed in said housing and connected to a power source, said housing having a cable inlet on a wall of said housing;

cooling means in said housing for cooling said light emitter;

an elongated, side-emitting fiber optic cable comprised of a flexible, transparent optical tube having one or more strands of optic fibers disposed therein, said fiber optic cable having a proximal end, a distal end and an outside surface, said one or more strands of optical fibers suitable for transmitting light therein and emitting light through said optical tube, said proximal end of said fiber optic cable configured so that said optic fibers can receive light through said proximal end of said fiber optic cable, said proximal end of said fiber optic cable disposed in said housing through said cable inlet such that said optic fibers are in light communication with said light emitter;

an elongated frame attached to said boat; said frame having a pair of opposing side members extending generally upwardly and inwardly from a base member to form a partially enclosed cavity on a front side of said frame, each of said side members having a distal end, said distal ends of side members forming an opening into said cavity; and a generally resilient bumper guard shaped and configured to be securely received in said partially enclosed cavity through said opening, said bumper guard having a pair of cable guards protruding outwardly from said base member of said frame beyond said outside surface of said fiber optic cable, said cable guards configured to securely receive said fiber optic cable between said pair of cable guards.

20. The fiber optic assembly and mounting apparatus according to claim 19, wherein said lighting unit further comprises color changing means disposed between said light emitter and said proximal end of said fiber optic cable for changing the color of the light from said light emitter prior to the light entering said optic fibers.

\* \* \* \* \*